(12) United States Patent
Tamura et al.

(10) Patent No.: US 10,791,228 B2
(45) Date of Patent: Sep. 29, 2020

(54) IMAGE PROCESSING APPARATUS WITH MALICIOUS CODE DETECTION PROCESSING AND CONTROL PROGRAM

(71) Applicant: KONICA MINOLTA, INC., Chiyoda-ku, Tokyo (JP)

(72) Inventors: Atsushi Tamura, Amagasaki (JP); Yuji Okamoto, Amagasaki (JP); Hidetaka Iwai, Itami (JP); Takehisa Yamaguchi, Ikoma (JP); Nobuhiro Mishima, Osaka (JP); Katsuyuki Sugita, Osaka (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/381,114

(22) Filed: Apr. 11, 2019

(65) Prior Publication Data
US 2019/0342460 A1    Nov. 7, 2019

(30) Foreign Application Priority Data

May 1, 2018   (JP) ................................. 2018-088269

(51) Int. Cl.
*H04N 1/00*    (2006.01)

(52) U.S. Cl.
CPC ..... *H04N 1/00148* (2013.01); *H04N 1/00167* (2013.01); *H04N 1/00233* (2013.01)

(58) Field of Classification Search
None
See application file for complete search history.

(56) References Cited

U.S. PATENT DOCUMENTS

| | | | | |
|---|---|---|---|---|
| 9,407,648 | B1* | 8/2016 | Pavlyushchik | ......... G06F 9/544 |
| 2012/0268757 | A1* | 10/2012 | Honma | .................... H04N 1/40 |
| | | | | 358/1.9 |
| 2015/0242734 | A1* | 8/2015 | Kumagai | ........... G06K 15/1886 |
| | | | | 358/1.15 |

FOREIGN PATENT DOCUMENTS

| | | |
|---|---|---|
| JP | 2005229611 A | 8/2005 |
| JP | 2006256104 A | 9/2006 |
| JP | 2006277004 A | 10/2006 |
| JP | 2008046826 A | 2/2008 |
| JP | 2011039599 A | 2/2011 |

* cited by examiner

*Primary Examiner* — Lennin R Rordriguezgonzalez
(74) *Attorney, Agent, or Firm* — Buchanan Ingersoll & Rooney PC

(57) ABSTRACT

An image processing apparatus includes: an image processing part; a storage part including a nonvolatile region that stores data in a nonvolatile manner; and a hardware processor that controls the image processing part, wherein the nonvolatile region includes a plurality of storage regions, the storage part stores setting information indicating whether each of the plurality of storage regions is a target of malicious code detection processing, and the hardware processor performs the malicious code detection processing only on a storage region that is the target of the malicious code detection processing based on the setting information among the plurality of storage regions.

6 Claims, 12 Drawing Sheets

FIG. 8

REGION ATTRIBUTE 1920

| REGION NAME | EXTERNAL ACCESS |
|---|---|
| FUJITA | NOT ALLOWED |
| NISHIWAKI | NOT ALLOWED |
| KAWANISHI | ALLOWED |
| : | : |

1924

VIRUS SCAN SETTING 1925

| EXTERNAL ACCESS | NECESSITY OF VIRUS SCAN |
|---|---|
| ALLOWED | NECESSARY |
| NOT ALLOWED | NOT NECESSARY |

FIG. 11

| FILE ATTRIBUTION | | | 1926 |
|---|---|---|---|
| REGION NAME | FILE NAME | ATTRIBUTE | |
| KAWANISHI | Scan-01.pdf | INTERNALLY GENERATED | |
| KAWANISHI | Scan-02.pdf | INTERNALLY GENERATED | |
| KAWANISHI | Scan-03.pdf | INTERNALLY GENERATED | |
| KAWANISHI | Scan-04.pdf | INTERNALLY GENERATED | |
| KAWANISHI | Scan-05.pdf | INTERNALLY GENERATED | |
| KAWANISHI | CONFERENCE MATERIAL_MMDD.docx | INPUT FROM EXTERNAL | |
| KAWANISHI | INFORMATION DEVICE MANAGEMENT TABLE_SALES DEPT.xlsx | INPUT FROM EXTERNAL | |
| KAWANISHI | Scan-06.pdf | INTERNALLY GENERATED | |

FILE FOR WHICH VIRUS SCAN IS NOT PERFORMED IN KAWANISHI REGION

FILE FOR WHICH VIRUS SCAN IS PERFORMED IN KAWANISHI REGION

FILE FOR WHICH VIRUS SCAN IS NOT PERFORMED IN KAWANISHI REGION

FIG. 12

| VIRUS SCAN SETTING | 1927 |
| --- | --- |
| ATTRIBUTE | NECESSITY OF VIRUS SCAN |
| INPUT FROM EXTERNAL | NECESSARY |
| INTERNALLY GENERATED | NOT NECESSARY |

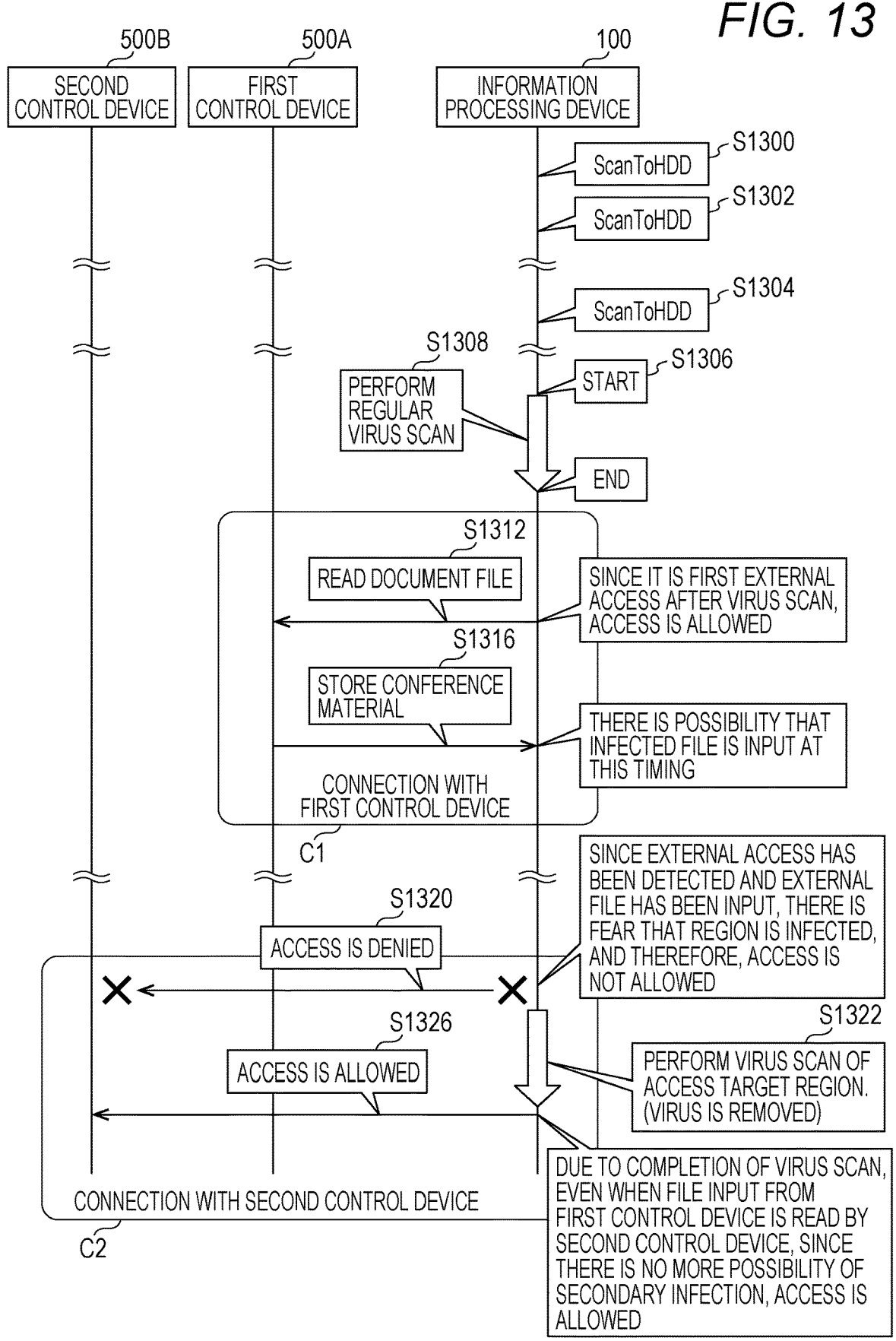

IMAGE PROCESSING APPARATUS WITH MALICIOUS CODE DETECTION PROCESSING AND CONTROL PROGRAM

The entire disclosure of Japanese patent Application No. 2018-088269, filed on May 1, 2018, is incorporated herein by reference in its entirety.

BACKGROUND

Technological Field

The present disclosure relates to malicious code detection processing such as a virus scan in an image processing apparatus.

Description of the Related Art

Conventionally, in an image processing apparatus such as a multi-functional peripheral (MFP), malicious code detection processing such as a virus scan is performed in order to secure operation safety. Regarding malicious code detection processing in an image processing apparatus, various technologies are proposed in JP 2005-229611 A, JP 2006-256104 A, JP 2006-277004 A, JP 2008-046826 A, JP 2011-039599 A, and the like.

However, since resources for performing control processing in an image processing apparatus is finite, performance of an image processing apparatus may be degraded due to execution of malicious code detection processing.

SUMMARY

The present disclosure has been devised in view of the above circumstances, and an object thereof is to avoid degradation in performance in an image processing apparatus as much as possible while securing the operation safety.

To achieve the abovementioned object, according to an aspect of the present invention, an image processing apparatus reflecting one aspect of the present invention comprises: an image processing part; a storage part including a nonvolatile region that stores data in a nonvolatile manner; and a hardware processor that controls the image processing part, wherein the nonvolatile region includes a plurality of storage regions, the storage part stores setting information indicating whether each of the plurality of storage regions is a target of malicious code detection processing, and the hardware processor performs the malicious code detection processing only on a storage region that is the target of the malicious code detection processing based on the setting information among the plurality of storage regions.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a diagram showing an example of information stored in the setting region corresponding to the example of FIG. 7;

FIG. 11 is a diagram for explaining still another example of storage contents of the setting region;

FIG. 12 is a diagram for explaining still another example of storage contents of the setting region; and FIG. 13 is a diagram showing a sequence of processing corresponding to access from an external device.

DETAILED DESCRIPTION OF EMBODIMENTS

Figure 1:
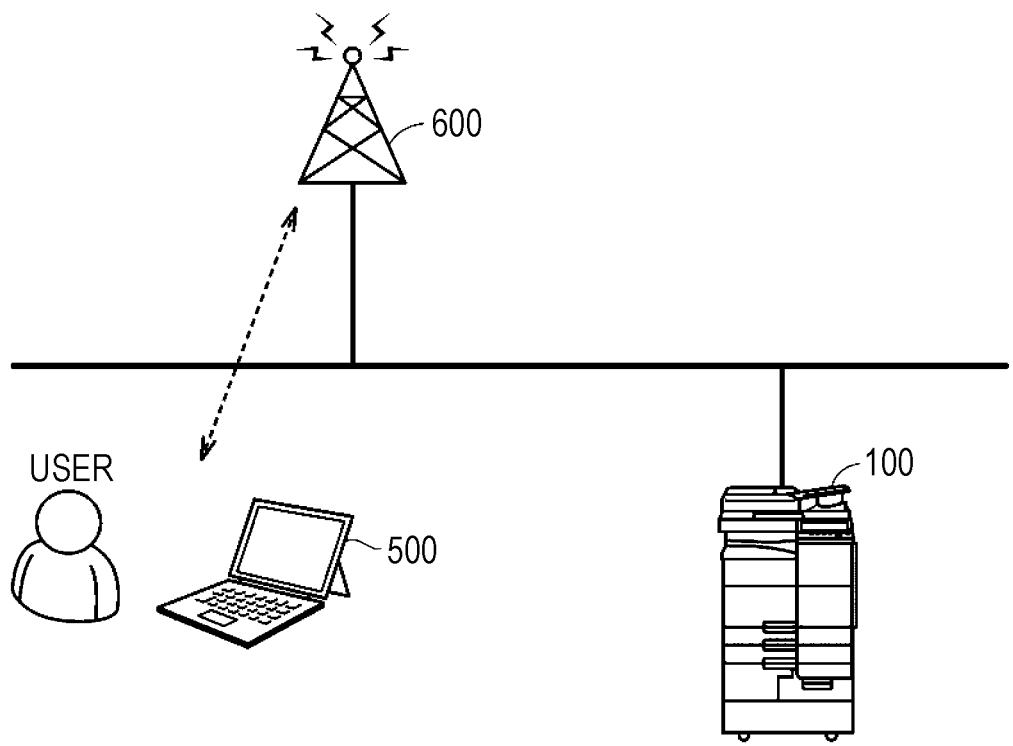
FIG. 1 is a diagram showing an example of a configuration of a network system including an information processing device which is an example of an image processing apparatus.

Hereinafter, one or more embodiments of the present invention will be described with reference to the drawings. However, the scope of the invention is not limited to the disclosed embodiments. In the following description, the same parts and constituent elements are denoted by the same reference numerals. Names and functions thereof are also the same. Therefore, description of these will not be repeated.

1. Configuration of Network System

FIG. 1 is a diagram showing an example of a configuration of a network system including an information processing device which is an example of an image processing apparatus. With reference to FIG. 1, an example of a method of using the information processing device in the network system will be described.

The network system of FIG. 1 includes an information processing device 100, a control device 500 used by a user, and an access point 600. The information processing device 100 is a device having an image processing function, such as an MFP.

The control device 500 accesses the information processing device 100 through the access point 600. The user instructs the information processing device 100 to perform printing operation via the control device 500 and also stores a file in the information processing device 100. As will be described later, the information processing device 100 is characterized by a mode of virus scan (malicious code detection processing) of a file stored in the information processing device 100.

2. Configuration of Information Processing Device

Figure 2:
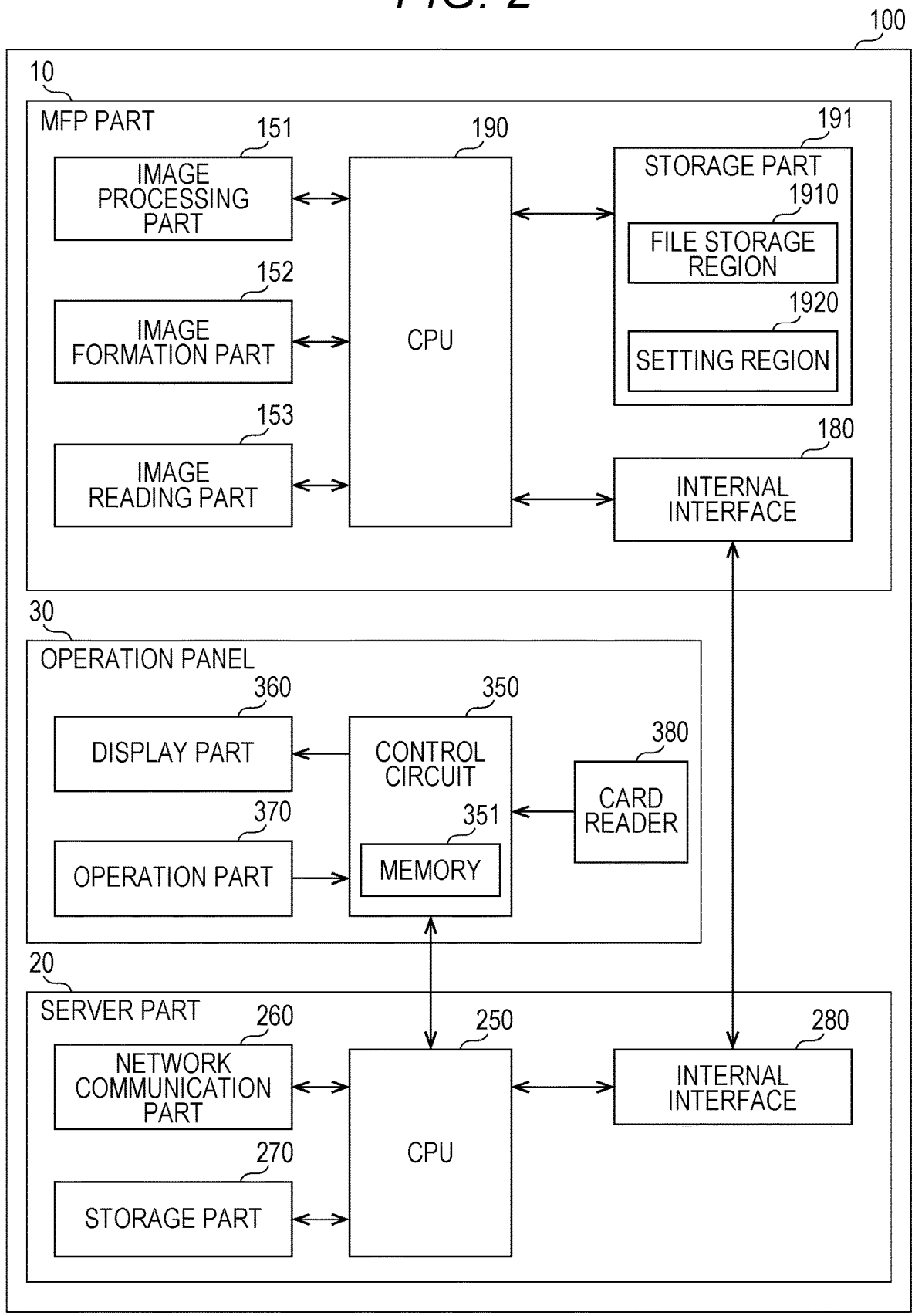
FIG. 2 is a diagram showing an example of a hardware configuration of an information processing device.

FIG. 2 is a diagram showing an example of a hardware configuration of the information processing device 100.

With reference to FIG. 2, the configuration of the information processing device 100 will be described.

In the present disclosure, the information processing device 100 is realized as a device in which a server and an MFP are integrally configured. The information processing device 100 includes an MFP part 10, a server part 20, and an operation panel 30. The operation panel 30 is used as a user interface of the MFP part 10 and the server part 20. The configuration of each of the MFP part 10 and the server part 20 will be described below.

(MFP Part 10)

The MFP part 10 includes a central processing unit (CPU) 190 for controlling the entire MFP part 10, and a storage part 191. The storage part 191 is realized by, for example, a nonvolatile memory. A file storage region 1910 for storing files and a setting region 1920 for storing various settings may be set in the storage part 191. The information stored in the storage part 191 may include a program executed by the CPU 190 and data used for executing the program.

The MFP part 10 further includes an image processing part 151, an image formation part 152, an image reading part 153, and an internal interface 180. The image processing part 151 performs processing such as enlargement/reduction of an output image, for example, by processing the input image data. The image processing part 151 is realized by, for example, a processor and a memory for image processing. The image formation part 152 is realized by a toner cartridge, a sheet tray for accommodating a recording sheet, a hardware resource for forming an image on the recording sheet, such as a photosensitive body, and a hardware resource for conveying the recording sheet. The image reading part 153 is realized by a hardware resource configured to create image data of a document such as a scanner. Since each function of the image processing part 151, the image formation part 152, and the image reading part 153 can be those well known in image forming apparatuses, the detailed description thereof will not be repeated here.

The internal interface 180 functions as an interface for communication with the server part 20, and is realized by, for example, a local area network (LAN) card.

(Server Part 20)

The server part 20 includes a CPU 250 for controlling the entire server part 20, a network communication part 260, a storage part 270, and an internal interface 280.

The network communication part 260 is realized by a hardware resource configured to perform transmission and reception of data with an external device such as a terminal 500 via a global network. An example of the hardware resource is a network card. The CPU 250 communicates with an external device via the network communication part 260.

The storage part 270 is realized by, for example, a nonvolatile memory. The information stored in the storage part 270 may include a program executed by the CPU 250 and data used for executing the program.

The CPU 250 is further configured to control the operation panel 30. The operation panel 30 includes a control circuit 350, a display part 360 realized by an organic electro luminescence (EL) display or the like, an operation part 370 realized by a touch sensor or the like, and a card reader 380 realized by a contactless card reader or the like.

The control circuit 350 controls display operation of the display part 360 according to a control signal from the CPU 250. The operation part 370 outputs input information to the control circuit 350. The control circuit 350 outputs a signal corresponding to the information input from the operation part 370 to the CPU 250. The control circuit 350 transfers the data read by the card reader 380 to the server part 20 in accordance with the control signal from the CPU 250.

3. Storage Mode in File Storage Region

Figures 3, 4:
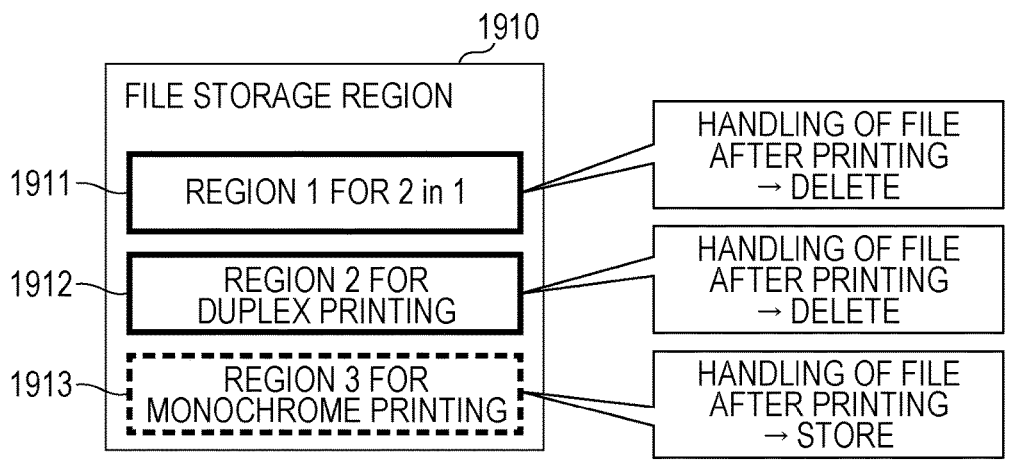
FIG. 3 is a diagram showing an example of a file storage mode in a file storage region.
FIG. 4 is a diagram showing an example of information stored in a setting region.

FIG. 3 is a diagram showing an example of a file storage mode in the file storage region 1910. With reference to FIG. 3, a file storage mode in the file storage region 1910 will be described.

The file storage region 1910 includes three regions 1911, 1912, 1913 for storing a file (document) to be printed by the image formation part 152. Each of the regions 1911, 1912, 1913 is associated with a print setting. The region 1911 is a region for storing a file to be printed using a page aggregation function "2 in 1". The region 1912 is a region for storing a file on which images are printed on both surfaces of a sheet. The region 1913 is a region for storing a file to be printed in monochrome. In one example, the CPU 190 stores each of a file received from an external device such as the control device 500, a file received from the server part 20, and a file generated by the image reading part 153, in a region corresponding to the print setting associated with each file among the file storage region 1910.

4. Information Stored in Setting Region

FIG. 4 is a diagram showing an example of information stored in the setting region 1920. With reference to FIG. 4, the contents of the information will be described.

The setting region 1920 includes a file attribute 1921 and a virus scan setting 1922.

The file attribute 1921 specifies the handling after printing of a file stored in each region in the file storage region 1910. In FIG. 4, "delete" means deleting a file after printing, and "store" means storing a file until deleting operation after printing.

That is, in the example of FIG. 4, the file stored in the region 1911 (the region of the file for 2 in 1) and the file stored in the region 1912 (the region of the file for duplex printing) are deleted after printing (without requiring operation for deletion). The file stored in the region 1913 (the region of the file for monochrome printing) is stored even after printing, until the operation for deletion is performed.

The virus scan setting 1922 specifies necessity of a virus scan for each handling prescribed in the file attribute 1921. In the example of FIG. 4, the virus scan is set to be unnecessary in the region where the handling "delete" is set in the file attribute 1921. Virus scan is set to be necessary in the region where handling "store" is set in the file attribute 1921.

Therefore, in the example of FIG. 4, the file stored in the region 1911 (the region of the file for 2 in 1) and the file stored in the region 1912 (the region of the file for duplex printing) are not included in the target of the virus scan. In the regions 1911, 1912, files input from external are stored, but these files are deleted immediately after printing. Therefore, even if these files are infected with viruses, there is no possibility that the server part 20 or the client device (such as the control device 500) accesses these files and is secondarily infected. Note that in the region 1911 and the region 1912, system files specifying print audit logs, printing settings, or the like may be stored.

On the other hand, in the example of FIG. 4, the file stored in the region 1913 (the region of the file for monochrome printing) is included in the target of the virus scan. The file stored in the region 1913 continues to be stored in the region 1913 after printing and there is a possibility that the file is accessed from the server part 20 or the client device (the control device 500 or the like). If the file stored in the region 1913 is infected with a virus, the client device may be secondarily infected. Secondary infection can be reliably avoided by making the file in the region 1913 be included in the target of virus scan.

As described above with reference to FIG. 4, in the information processing device 100, a minimum number of files are included in the target of the virus scan for the purpose of avoiding secondary infection of the server part 20 and the client device, or the like. As a result, while securing the safety of the operation in the information processing device 100 including the MFP part 10 and the server part 20 connected to the MFP part 10, and the safety of the operation of the client device, reduction in performance of the MFP part 10 can be avoided as much as possible.

5. Processing Flow

Example 1

Figure 5:
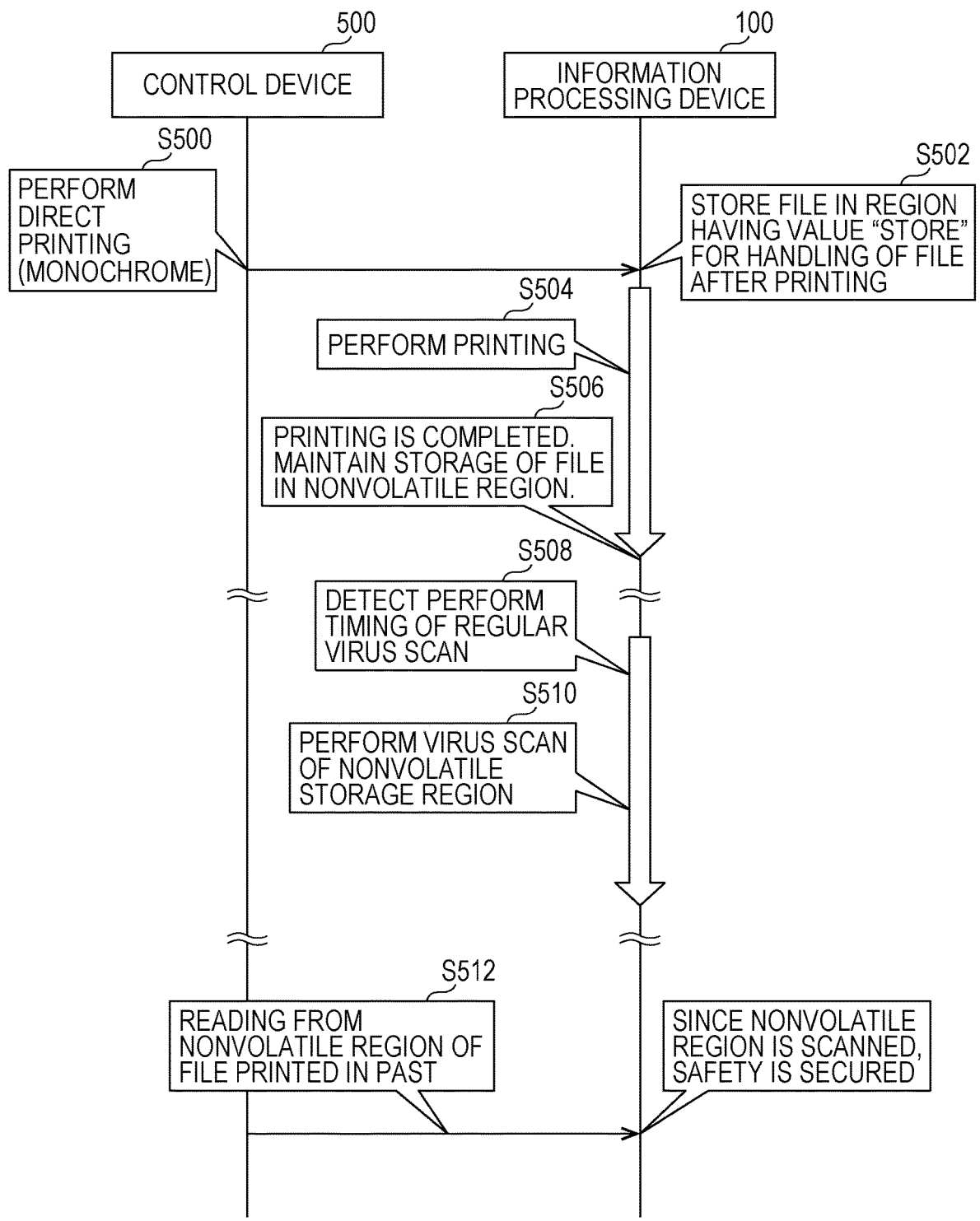
FIG. 5 is a diagram showing an example of processing for the information processing device to perform a print instruction from a control device.

FIG. 5 is a diagram showing an example of processing for the information processing device 100 to perform a print instruction from the control device 500. The example of FIG. 5 relates to printing of a file in which "store" is set as handling of a file after printing. With reference to FIG. 5, the flow of this processing will be described.

In step S500, the control device 500 transmits an instruction of direct printing by monochrome printing to the information processing device 100. The instruction includes a file to be printed.

In step S502, the CPU 190 of the information processing device 100 stores the received file in a region corresponding to the setting of the file. Since the print setting instructed in step S500 is monochrome printing, the received file is stored in the region 1913. Note that the CPU 190 executes the program stored in the storage part 191, for example, to realize the control in step S502 and the subsequent steps.

In step S504, the CPU 190 performs printing of the file stored in step S502. The file is printed in monochrome.

In step S506, the CPU 190 handles the file printed in step S504 according to the region in which the file is stored. The region 1913 is set so that a file is stored even after printing. Therefore, the CPU 190 maintains the file in the region 1913 until active operation for deletion is performed.

When it is detected in step S508 that the execution timing of a regular virus scan to the file storage region 1910 has arrived, the CPU 190 performs the virus scan in step S510. The target of the virus scan in the file storage region 1910 is only for the region where the value of "handling of file after printing" is "store". The storage location of the file in step S502 is the region 1913. The value of "handling of file after printing" in the region 1913 is "store" (FIG. 4). Therefore, the region (region 1913) where the file received in step S502 is stored is included in the target of the virus scan.

Therefore, as shown in step S512, even when the control device 500 (or another client device) reads the file stored in the file storage region 1910 in step S502, since the virus scan is performed on the file, the safety of the system can be secured.

Example 2

Figure 6:
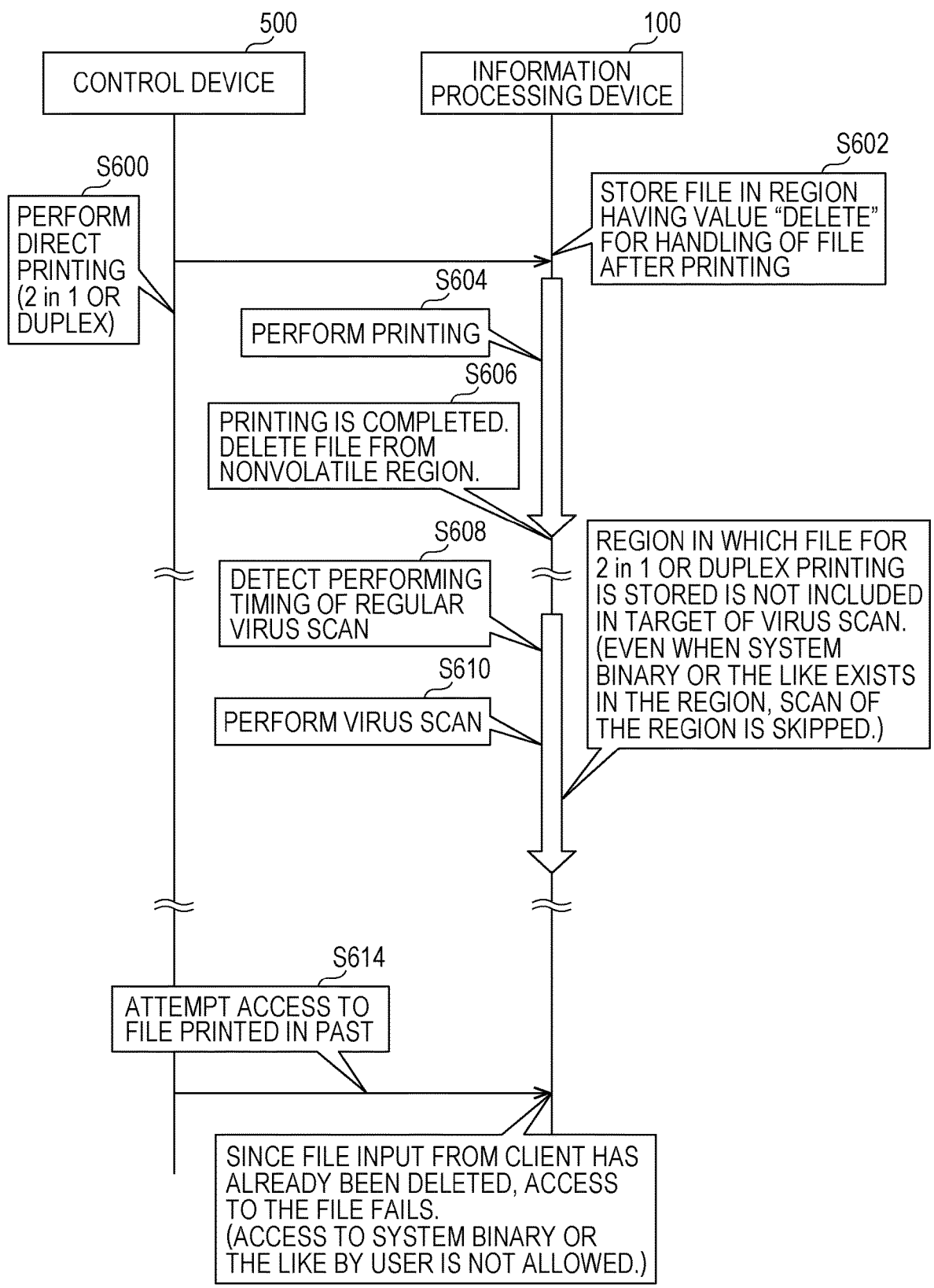
FIG. 6 is a diagram showing another example of processing for the information processing device to perform a print instruction from the control device.

FIG. 6 is a diagram showing another example of processing for the information processing device 100 to perform a print instruction from the control device 500. The example of FIG. 6 relates to printing of a file in which "delete" is set as handling of a file after printing. With reference to FIG. 6, the flow of this processing will be described.

In step S600, the control device 500 transmits an instruction of direct printing by monochrome printing to the information processing device 100. The instruction includes a file to be printed.

In step S602, the CPU 190 of the information processing device 100 stores the received file in a region corresponding to the setting of the file. Since the print setting instructed in step S600 is "2 in 1" or "duplex printing", the received file is stored in the region 1911 or the region 1912.

In step S604, the CPU 190 performs printing of the file stored in step S602.

In step S606, the CPU 190 handles the file printed in step S604 according to the region in which the file is stored. The region 1911 or the region 1912 is set so that a file is deleted after printing. Therefore, the CPU 190 deletes the file.

In step S608, when the execution timing of a regular virus scan to the file storage region 1910 has arrived, the CPU 190 performs the virus scan in step S610. The target of the virus scan in the file storage region 1910 is only for the region where the value of "handling of file after printing" is "store". The storage location of the file received in step S602 is the region 1911 or the region 1912. The value of "handling of file after printing" in the region 1911 and the region 1912 is "delete" (FIG. 4). Therefore, the regions (region 1911 or region 1912) in which the file received in step S602 is stored is not included in the target of the virus scan.

As shown in step S612, it is assumed that the control device 500 (or another client device) attempts to access the file received in step S602. In this case, the file has already been deleted in step S606. Therefore, the control device 500 fails to access the file. As a result, even when the region in which the file received in step S602 is stored is not included in the target of the virus scan, since the file is deleted immediately after printing, the security of the system can be secured.

6. Another Example of Classification of Region in File Storage Region

Figure 7:
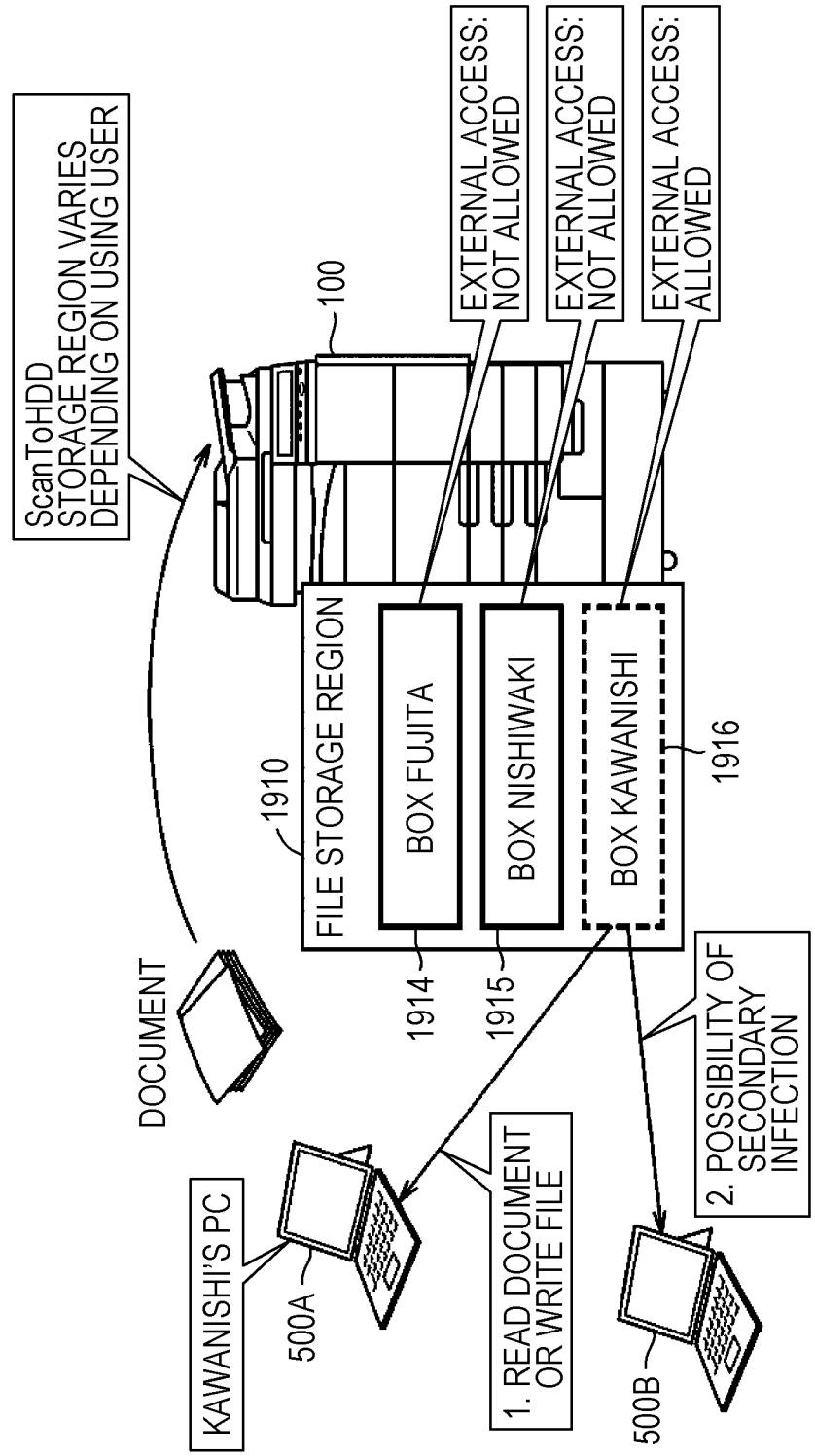
FIG. 7 is a diagram for explaining another example of classification of a region in the file storage region.

FIG. 7 is a diagram for explaining another example of classification of a region in the file storage region 1910.

In the example of FIG. 7, the file storage region 1910 includes three regions 1914, 1915, 1916 set for each user. The region 1914 is a region set for the user "Fujita", and the name of the region is "Fujita". The region 1915 is a region set for the user "Nishiwaki", and the name of the region is "Nishiwaki". The region 1916 is a region set for the user "Kawanishi", and the name of this region is "Kawanishi".

In the example of FIG. 7, each user needs to log in to the information processing device 100 in order to store the file in the file storage region 1910. Each user can store files only in the region set for each user. For example, the user "Fujita" can store files only in the region 1914 in the file storage region 1910.

FIG. 8 is a diagram showing an example of information stored in the setting region 1920 corresponding to the example of FIG. 7. In the example of FIG. 8, the setting region 1920 includes a region attribute 1924 and a virus scan setting 1925.

The region attribute 1924 specifies whether or not to allow access from an external device to each of the regions 1914, 1915, 1916. The value "allowed" means that access from an external device (such as the control device 500) is allowed. The value "not allowed" means that access from an external device is not allowed. For example, the CPU 190 allows access from an external device to the file in the region 1916 (region name "Kawanishi") and allows the storage of the file from an external device to the region 1916 (region name "Kawanishi"). On the other hand, the CPU 190 prohibits access from an external device to the region 1914 (region name "Fujita") and the region 1915 (region name "Nishiwaki"), and prohibits storing of the file from an external device to these regions.

The virus scan setting 1925 specifies setting of the virus scan for each value specified in the region attribute 1924. More specifically, the virus scan setting 1925 specifies that the virus scan is "necessary" for the value "allowed" in the region attribute 1924, and specifies that the virus scan is "not necessary" for the value "not allowed" in the region attribute 1924.

Figure 9:
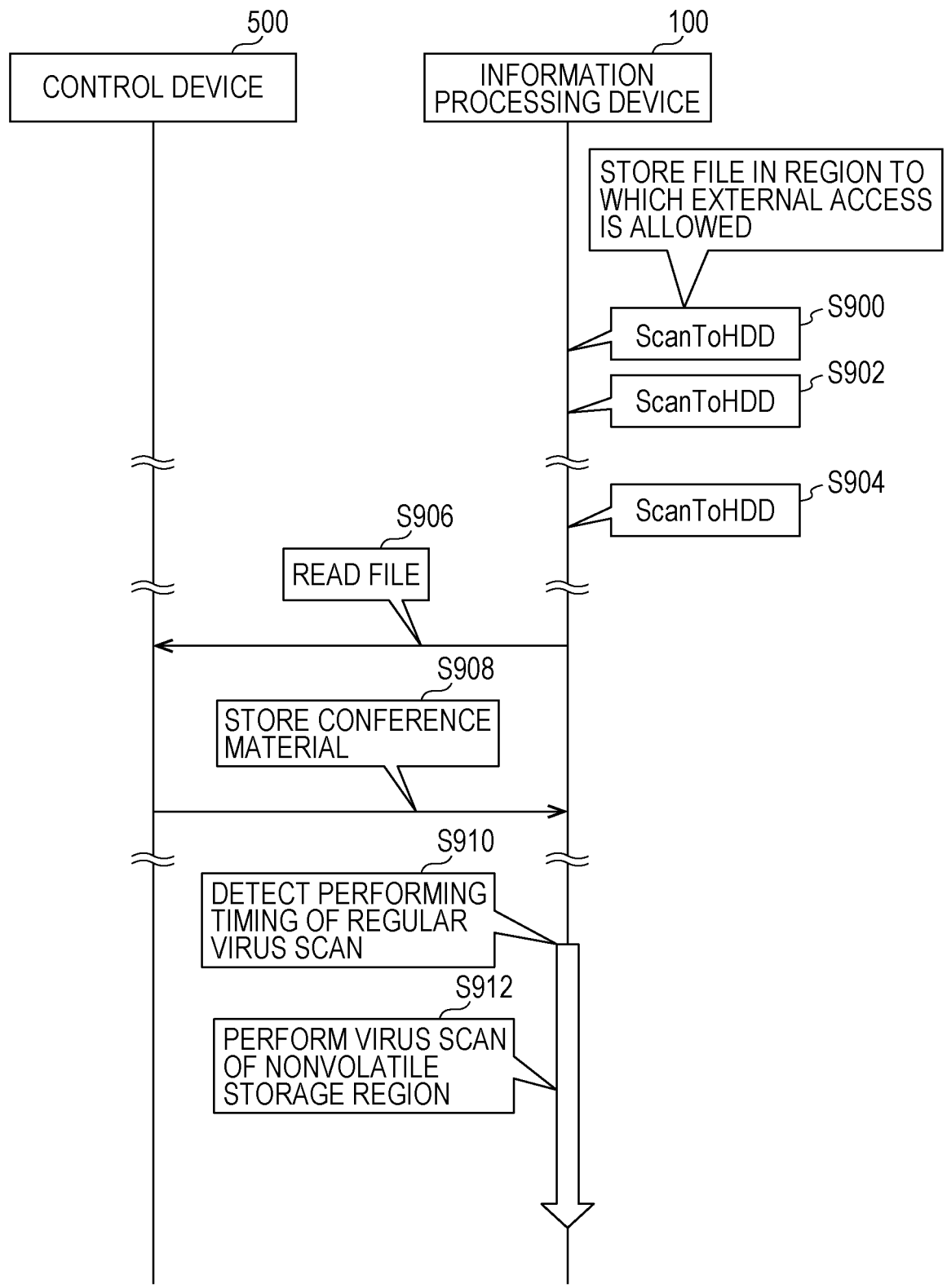
FIG. 9 is a diagram showing a sequence of processing related to a region to which access from an external device is allowed.

FIG. 9 shows a sequence of processing related to a region to which access from an external device is allowed. In each of steps S900, S902, S904, the CPU 190 stores the file by "Scan_To_HDD" in the region. "Scan_To_HDD" is processing of storing image data of a document read by the image reading part 153 in the file storage region 1910. In the example of FIG. 9, for example, the user "Kawanishi" logs in to the information processing device 100 and executes "Scan_To_HDD". As a result, the generated image data is stored in the region 1916.

Access to the region 1916 from an external device is allowed. Accordingly, when an external device requests access to a file in the region 1916, the CPU 190 allows the external device to read the file in the region 1916 in step S906. Further, when an external device requests to store the file to the region 1916, the CPU 190 stores the file (for example, conference material) that is the target of the request, in the region 1916 in step S908.

When it is detected in step S910 that the execution timing of a regular virus scan to the file storage region 1910 has arrived, the CPU 190 performs the virus scan in step S912. The target of the virus scan in the file storage region 1910 includes only the region having the value of external access of "allowed". The region 1916 is included in the target of the virus scan since the value of external access is "allowed". Therefore, even when the region 1916 is accessed from an external device, the security of the network system can be secured.

Note that the CPU 190 may be configured to allow a request to access the file in the region 1916 in step S906 on condition that the virus scan of the file in the region 1916 is completed. As a result, the safety of the network system can be secured more reliably.

Figure 10:
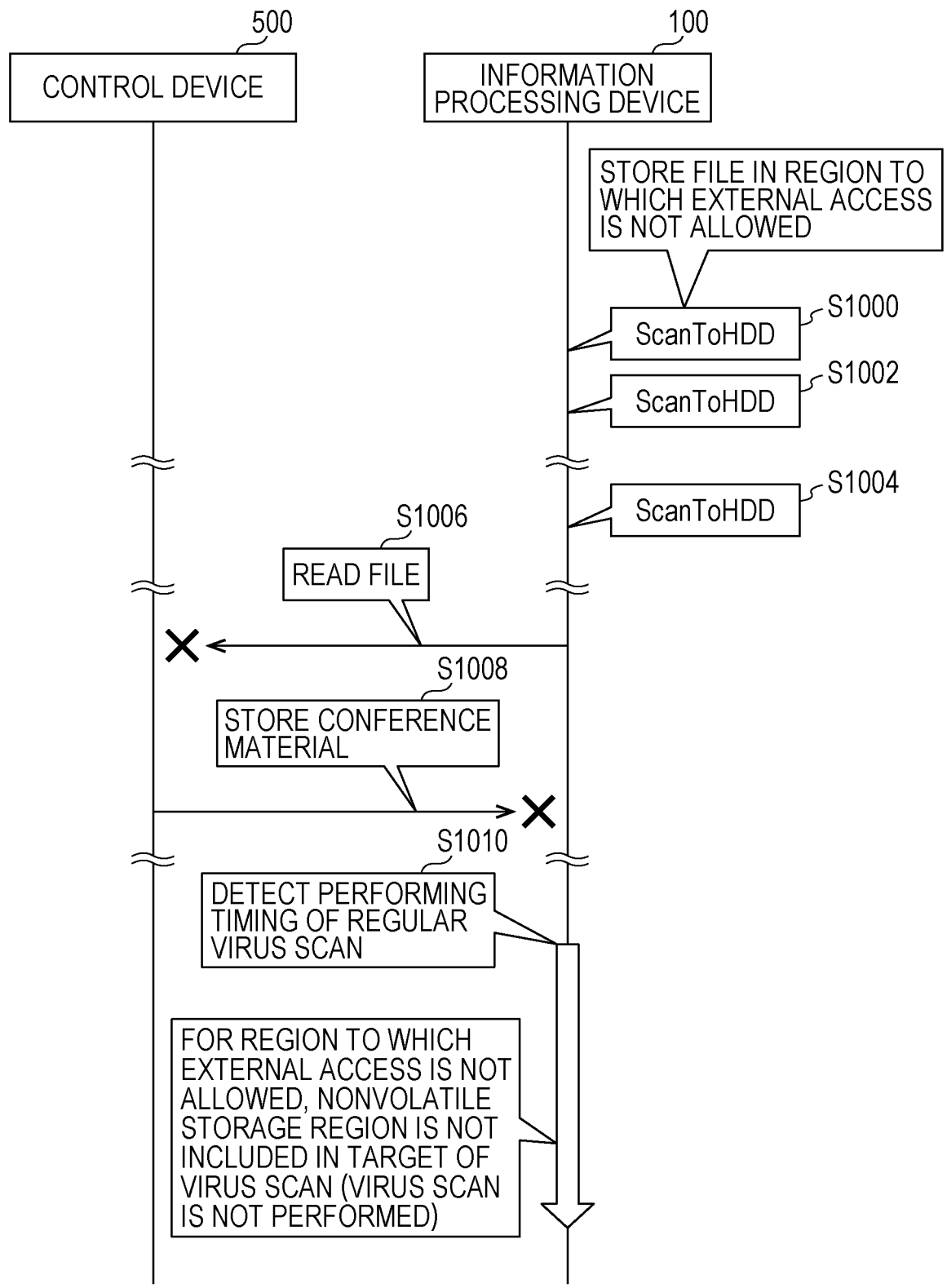
FIG. 10 is a diagram showing a sequence of processing related to a region to which access from an external device is not allowed.

FIG. 10 shows a sequence of processing related to a region to which access from an external device is not allowed. In each of steps S1000, S1002, S1004, the CPU 190 stores the file by "Scan_To_HDD" in the region. In the example of FIG. 10, for example, the user "Fujita" logs in to the information processing device 100 and executes "Scan_To_HDD". As a result, the generated image data is stored in the region 1914.

In the region 1914, access from an external device (also for the user "Fujita") is not allowed. Accordingly, even when an external device requests access to a file in the region 1914, the CPU 190 notifies the external device that reading of the file in the region 1914 is not allowed in step S1006. Even when an external device requests to store a file in the region 1914, the CPU 190 notifies the external device that storing of the file in the region 1914 is not allowed in step S1008.

When it is detected in step S1010 that the execution timing of a regular virus scan to the file storage region 1910 has arrived, the CPU 190 performs the virus scan. However, the target of the virus scan in the file storage region 1910 includes only the region having the value of external access of "allowed". The region 1914 is not included in the target of the virus scan since the value of external access is "not allowed". Since the region 1914 is not allowed to be accessed from an external device, the security of the network system can be secured even when the region 1914 is not included in the target of the virus scan.

7. Still Another Example of Classification of Region in File Storage Region

FIGS. 11 and 12 are diagrams for explaining still another example of storage contents of the setting region 1920. FIG. 11 shows the file attribute 1926 in the setting region 1920. FIG. 12 shows a virus scan setting 1927 in the setting region 1920.

The file attribute 1926 in FIG. 11 indicates the region name and attribute to be stored for each file. In the example of FIG. 11, each of the plurality of storage regions in the file storage region 1910 is configured by the region where each file is stored.

In FIG. 11, the attribute value "internally generated" indicates that a file has been generated in the information processing device 100. In the information processing device 100, for example, a file is generated by "Scan_To_HDD". The attribute value "input from external" indicates that the file has been generated outside the information processing device 100. In the information processing device 100, a file generated outside the information processing device 100 is stored in the file storage region 1910, for example, when the file is received from an external device.

As shown in FIG. 12, the setting region 1927 specifies necessity of virus scan for each attribute value in FIG. 11. More specifically, the value "necessary" of the virus scan setting is set in association with the value "input from external". The value "unnecessary" of the virus scan setting is set in association with the value "internally generated".

FIG. 13 shows a sequence of processing corresponding to access from an external device. In each of steps S1300, S1302, S1304, the CPU 190 generates a file by "Scan_To_HDD" and stores the file in the file storage region 1910. The value of the attribute (FIG. 11) of each file to be stored is "internally generated".

When it is detected in step S1308 that the execution timing of the regular virus scan to the file storage region 1910 has arrived, the CPU 190 performs virus scan only for the file having the value "input from external" in the file storage region 1910. That is, only the region storing the file having the value "input from external" is included in the target of the virus scan.

Thereafter, the information processing device 100 establishes a connection with a first external device 500A. In FIG. 13, a connection between the information processing device 100 and the first external device 500A is indicated by a connection C1.

Upon receiving a request to read the file in the file storage region 1910 from the first external device 500A, the CPU 190 allows the first external device 500A to read the file as the request target in step S1312.

In step S1312, after the virus scan, the CPU 190 may allow reading of the file on condition that the external device has not performed either storing or updating of the file in the file storage region 1910.

In step S1316, the CPU 190 stores a file (for example, conference material) in the file storage region 1910 in response to a request from the first external device 500A. The file is stored together with the value "input from external".

Until the virus scan of the file storage region 1910 is newly performed after step S1316, even when an external device requests access to the file in the file storage region 1910, the CPU 190 may deny the request.

The information processing device 100 establishes a connection with a second external device 500B. In FIG. 13, a connection between the information processing device 100 and the second external device 500B is indicated by a connection C2.

In step S1320, the CPU 190 denies the access request from the second external device 500B. This is because the virus scan of the file storage region 1910 has not been performed after step S1316.

When it is detected in step S1322 that the execution timing of the regular virus scan has arrived, the CPU 190 performs the virus scan of the file storage region 1910. The target of the virus scan is a region for storing a file having the value "input from external".

After the virus scan in step S1322, the CPU 190 allows a request for access to the file in the file storage region 1910 from the external device. In step S1326, the CPU 190 allows the access request from the second external device 500B.

According to an embodiment of the present disclosure, an image processing apparatus performs malicious code detection processing only on a storage region set as a target of the malicious code detection processing among a plurality of storage regions. As a result, the target of the malicious code detection processing can be suppressed to the minimum necessary.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising:
   an image processing part;
   a storage part including a nonvolatile region that stores data in a nonvolatile manner; and
   a hardware processor that controls the image processing part,
   wherein the nonvolatile region includes a plurality of storage regions, and each of the plurality of storage regions is assigned a file attribute,
   the storage part stores setting information indicating whether each of the file attributes identifies a storage region that includes data that is a target of malicious code detection processing, and
   the hardware processor performs the malicious code detection processing only on the data that is stored in a storage region that is identified as the target of the malicious code detection processing based on the setting information among the plurality of storage regions.

2. The image processing apparatus according to claim 1, further comprising
   a communication interface,
   wherein the attribute indicates at least one of whether the file is to be deleted from the storage region after image formation by the image processing part, and whether access from external using the communication interface is allowed.

3. The image processing apparatus according to claim 1, further comprising
   a communication interface,
   wherein the attribute indicates whether the file is generated by the image processing part or transmitted from external via the communication interface.

4. The image processing apparatus according to claim 1, wherein the setting information specifies that a first storage region in the plurality of storage regions is the target of the malicious code detection processing, and
   when the hardware processor receives an access to a file in the first storage region via the communication interface, the hardware processor allows the access on condition that the malicious code detection processing has been performed on the first storage region, and the file in the first storage region is not stored or updated from external after the malicious code detection processing.

5. A non-transitory recording medium storing a computer readable control program of an image processing apparatus, which includes a nonvolatile storage device including a plurality of storage regions, and each of the plurality of storage regions is assigned a file attribute,
   the nonvolatile storage device storing setting information indicating whether each of the file attributes identifies a storage region that includes data that is a target of malicious code detection processing,
   the control program causing a hardware processor of the image processing apparatus to execute
   performing the malicious code detection processing only on a storage region that includes data that is the target of the malicious code detection processing based on the setting information among the plurality of storage regions.

6. An image processing apparatus comprising:
   an image processing part;
   a storage part including a nonvolatile region that stores data in a nonvolatile manner; and
   a hardware processor that controls the image processing part,
   wherein the nonvolatile region includes a plurality of storage regions,
   the storage part stores setting information indicating whether each of the plurality of storage regions is a target of malicious code detection processing, and
   the hardware processor performs the malicious code detection processing only on a storage region that is the target of the malicious code detection processing based on the setting information among the plurality of storage regions;
   wherein the setting information specifies that a first storage region in the plurality of storage regions is the target of the malicious code detection processing, and
   when the hardware processor receives an access to a file in the first storage region via the communication interface, the hardware processor allows the access on condition that the malicious code detection processing has been performed on the first storage region.

* * * * *